United States Patent Office 3,707,425
Patented Dec. 26, 1972

3,707,425
MACHINE FOR TAGGING WIRES
Victor Joseph Jamal, Ashtabula, Ohio, assignor to Union Carbide Corporation, New York, N.Y.
Filed Dec. 22, 1970, Ser. No. 100,698
Int. Cl. B32b 31/10; B65c 3/02
U.S. Cl. 156—522
3 Claims

ABSTRACT OF THE DISCLOSURE

A machine for tagging bars, rods or wires of relatively small diameter with printed adhesive tapes. The machine features include a pair of cooperating flanged rollers actuated by drive mechanism perfectly sequenced to a supply source for feeding said bars, rods or wires through the machine.

---

The present invention relates to marking or labeling machines and more specifically to such machines for tagging wires, rods, or bars of relatively small diameter, hereinafter referred to as "rods."

Automatic labelers and marking systems which apply die-cut stick or pressure-sensitive adhesive labels from rolls on to objects of various configurations for identification are well known in the art. However, none of these commercially known labelers are suitable for tagging rods that are 1/16 in. in diameter or smaller.

Larger diameter rods in excess of 1/16 in. in diameter are commonly embossed successfully by the use of marking rolls. For diameters smaller than 1/16 inch, however, this procedure is not practical. Etching has been also tried with very little success. Color coding is also a possibility, but not very practical, as paint chips off, and it becomes difficult to identify the exact color code of the product.

Welding rods, in particular, have to be identified by a legible method such as by imprinting American Welding Society (AWS), or American Society of Testing Materials (ASTM) numbers and manufacturers' numbers and/or military designation on adhesive tape approximately ½ in. square, and attaching this tape or tag to the extreme end of the rod. Presently, the printed adhesive tape or tag is applied to the individual rods manually.

It is an object of the present invention to provide apparatus which is capable of applying an identification tape or tags to the individual rods automatically and permit the use of said automatic apparatus to operate in line with straightening and cutting machines upon which the welding rods are made.

It is still another object of the present invention to provide a tagging operation either for decorative, identification or for any other purpose on small diameter bars, rods or wires as may be required in a specific manufacturing operation.

Other objects and advantages of the present invention will be apparent from the following description and from the accompanying drawings forming a part of this specification in which.

It should be understood that the embodiment of the invention represented in the accompanying drawings is merely illustrative, and represents one preferred embodiment and should not be construed as limiting the scope of this invention.

Figure 1:
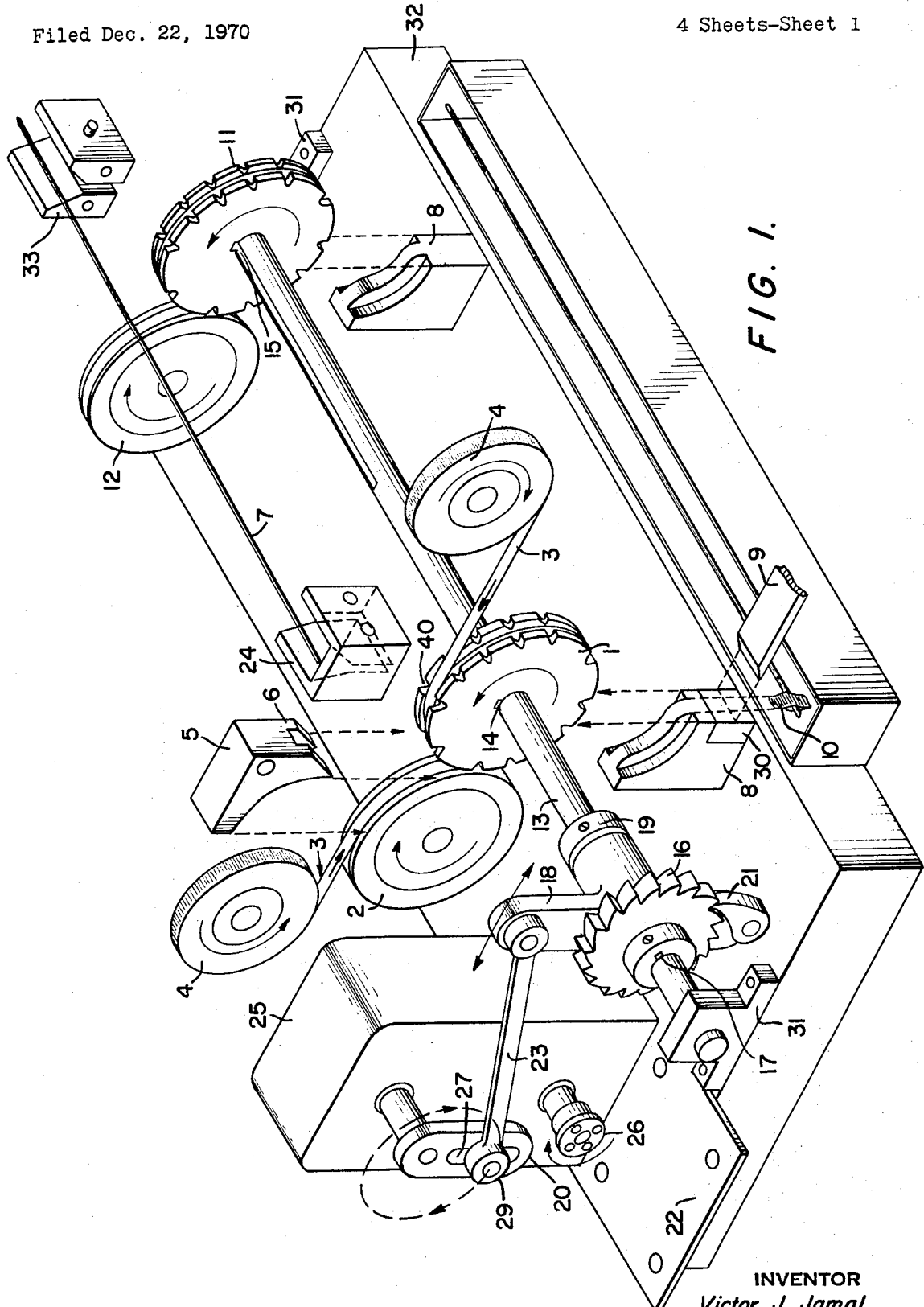
FIG. 1 is a view in perspective of a typical machine embodying the concepts of the invention.

Referring now to the drawings and, in particular, FIG. 1, the drive motor and electrical controls are mounted on base 22; however, they are not shown here so that the drive mechanism can be illustrated. The drive mechanism consists of a crank shaft 20 driven by a drive motor connected to shaft 26 through a gear reducer 25. The gear reducer 25 is adjusted so as to synchronize the operational sequence of the machine with that of the source of the rods, such as straightening and cutting machines. Crank 20 is pivotally attached to lever arm 18 through connecting rod 23. Crank 20 is provided with slot 27 which permits adjustments in the radius of the circular path followed by connecting rod pin 29 when crank 20 is rotated.

Figure 3:
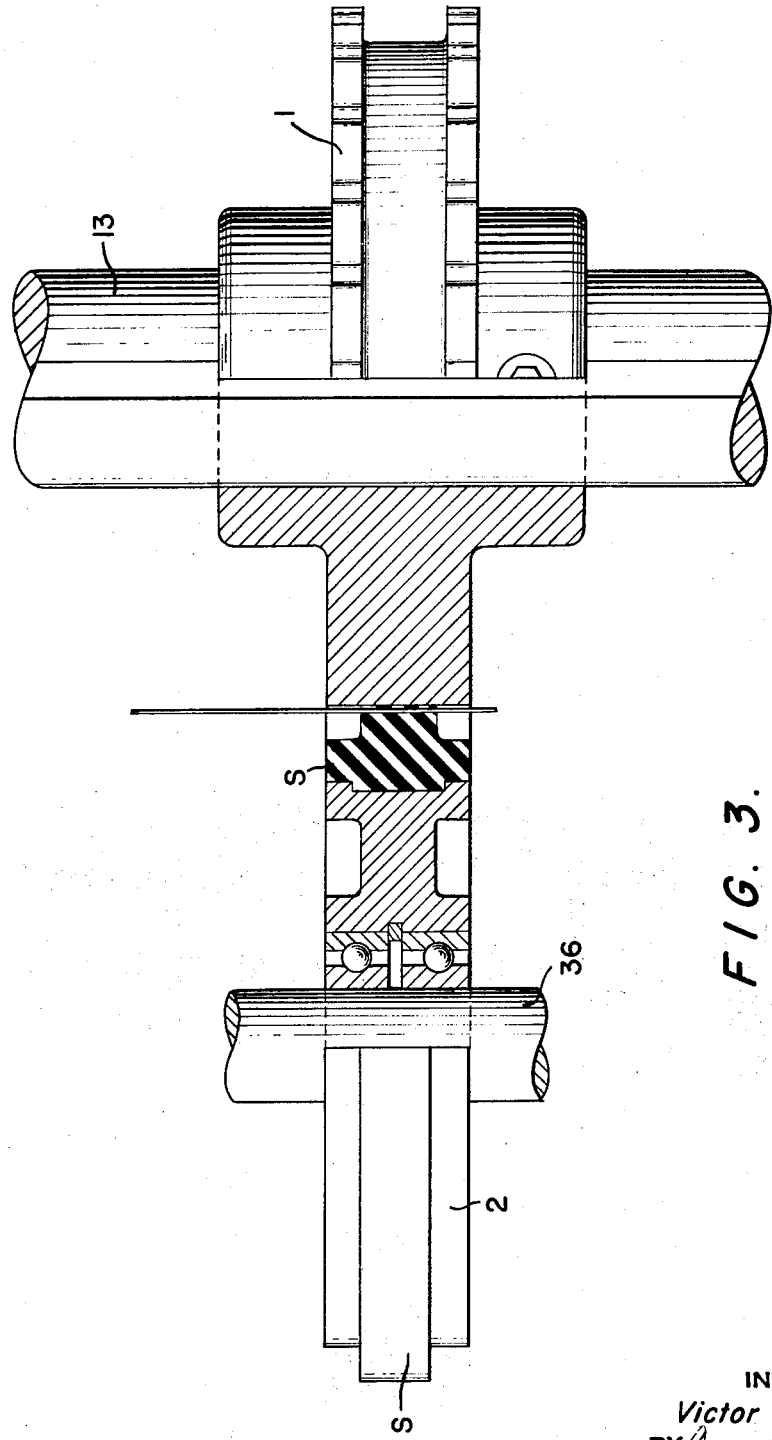
FIG. 3 is a cross section taken along the line A–A of FIG. 2.

Lever arm 18 is mounted on shaft 13 as is ratchet wheel 16 which is fixed thereto by key 17. Lever arm 18 is held in place by collar 19. Also keyed to shaft 13 at 14 is flanged roll 1. The distance between the flanges is slightly wider than the width of the tape 3 fed from tape rolls 4. This provides exact positioning on the flanged roll of the strands of tape being fed from rolls 4. A second similar roll 11 is movably keyed to shaft 13 through keyway 15 to process different lengths of wire. Cooperating rolls 2 and 12 are provided on respective shafts. Roll 2 is shown in FIG. 3 on its shaft 36. These rolls cooperate with rolls 1 and 11, respectively, in feeding the tape and rods through the machine. Rolls 2 and 12 have a surface S which is adapted to extend into the groove of flange 1. A grooved guide 5 shown in exploded view in FIG. 1 is placed on the top section of roll 2. The groove 6 in guide 5 provides the necessary tracking of the tape 3 over roll 2.

Figure 2:
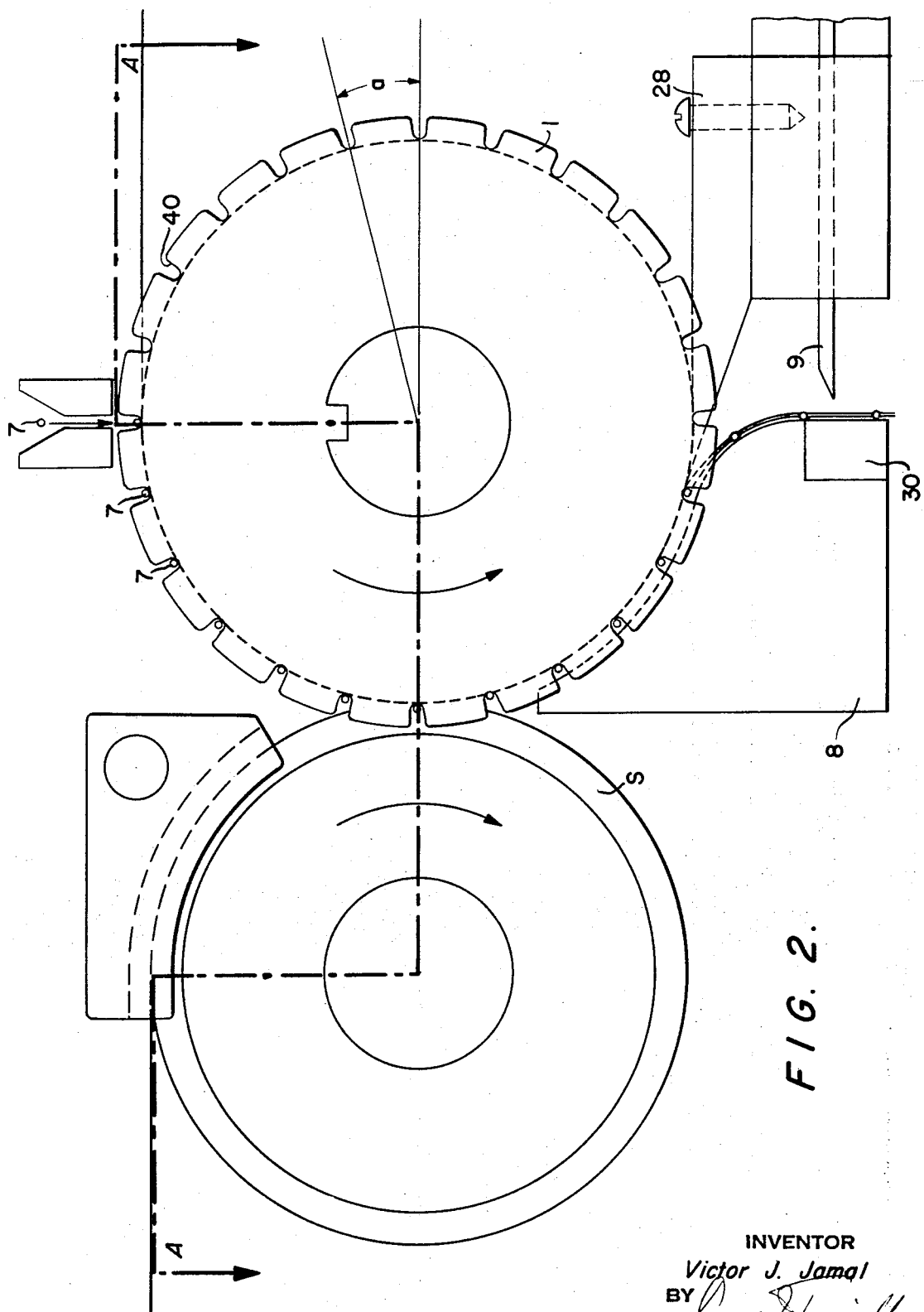
FIG. 2 is a side view of the roller assembly wherein two separate adhesive tapes are brought together while sandwiching the rod which has to be identified.

In operation, rods are discharged from a source such as a straightening and cutting machine or from a hopper through a feed mechanism synchronized to the operation of the machine as described above. The rods are admitted to guides 24 and 33. The rods drop by gravity through the slot in the guides 24 and 33 on to adhesive tape 3 which has its adhesive side up and the rod lodges itself in one of the U-grooves 40 in the roll 1 and the corresponding groove in roll 11. For each rod at guide 24, the crank 20 makes a complete 360-degree revolution. This produces a predetermined angular displacement of lever 18 which in turn engages ratchet wheel 16 through pawl 21 held by a spring not shown, and turns rolls 1 and 11. As shown in FIG. 2, the drive mechanism is designed so as to provide an angular displacement $a$ of 15 degrees for roll 1 each time crank 20 makes one revolution. The displacement $a$ can be varied, of course, depending on the diameter of the rolls and the size of the tag desired.

The U-shaped grooves at the flanges of roll 1 are also spaced 15 degrees apart so that at each cycle of the machine, a U-shaped groove is positioned below guide 24. At the sixth cycle or after six revolutions of crank 20, the rod progressively advances tangentially where it comes into contact with the adhesive tape fed from roll 2. (See FIG. 2).

The surface S of the roll 2 is made of rubber or other resilient material. At this point of contact, rolls 1 and 2 are squeezed together by a spring loaded bracket which supports the shaft on which is mounted roll 2 and applies pressure to the two strands of tape and sandwiches the wire 7 between them. Continuous feeding of rods 7 produces a strand of rods resembling a roller chain in which the links are the two tapes and the rollpins are the rods. This geometry of linking and engaging the rods into the U grooves of the roll 1 is important to achieve satisfactory traction. Normally, the glossy side of the tape which faces the outer surfaces of rolls 1 and 2 is slippery and the surface friction between the tape and the roll does not produce sufficient pull force to peel the tape off the supply roll. It takes approximately a one pound force to peel a ½ inch wide tape from a supply roll. In effect, the engagement of the rods and the tape act in the same manner as a sprocket and roller chain. This action easily facilitates the peeling of the tape off the supply reel.

Occasionally, sections of the adhesive tape may carry excessive amount of adhesive at the extreme edges of the tape which may have a tendency to hang on to roll 1. To prevent jamming of the machine, stripper 28 (see FIG. 2) is provided to separate the sandwiched tape from the roll.

Progressively, as rods 7 are fed down through guide 24, they travel around and out making approximately an 180° arc angle. At this exit point, knife 9 powered by solenoid or pneumatic cylinder, cuts the individual rod from the sandwiched ribbon striking tag 10 against anvil 30, thus providing an identification tag at the end of the bar. To prevent the rapid dulling of knife blade 9, anvil 30 is made of non-metallic material such as Teflon or hard wood or other suitable material. Anvil 30 is fastened to guide piece 8.

Shaft 13 is supported by bearing block 31, which is fixed on machine frame 32. Support members that hold tape supply reels 4, guides 5, 8, 24, 33, and the support for holding the solenoid or the pneumatic cylinder that actuates knife blade 9, are not shown. These support members are fixed to the machine frame 32.

The bracket supporting roll 12, and the support for guide 33, are adjustable with respect to their distance to guide 24. Likewise, flanged roll 11 can be moved along shaft 13 through keyway 15. This would permit processing different length rods, for example, 12″, 18″ and 36″ long, as desired.

An important feature of the present invention is the uniformity of the tags with respect to size and accurate positioning on the rod.

Figure 4:
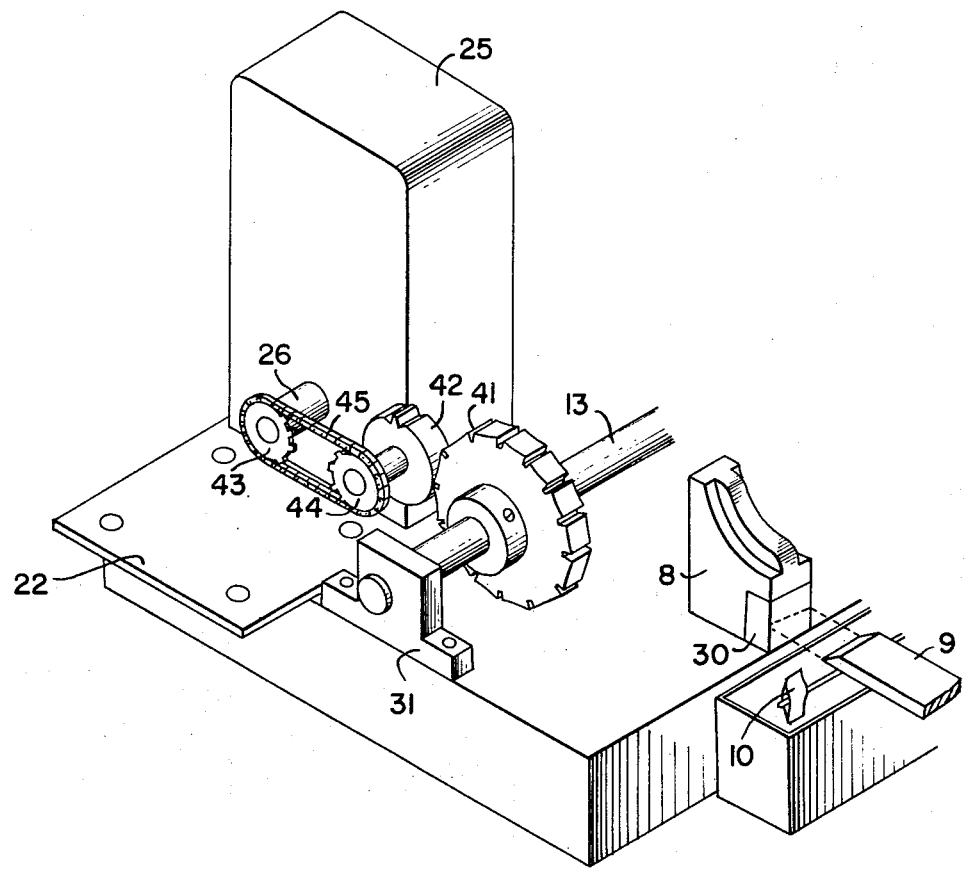
FIG. 4 illustrates a modification of the apparatus shown in FIG. 1.

Having described the invention with reference to certain preferred parts and arrangements thereof, it should be understood that certain modifications to said parts or the arrangement thereof, may be made without departing from the spirit and scope of this invention. For example, the ratchet and drive mechanism described may be replaced by gears which provide uniform intermittent motion, such arrangements being sometimes referred in the art as Geneva drives. Such drives, as shown in FIG. 4, consists of gears, so arranged that the driving gear 42, which has only one tooth, revolves, in this specific example described, 24 times for each revolution of the driven gear 41. This driven gear 41 replaces ratchet wheel 16 in FIG. 1. Driving gear 42 is, in turn, driven by a chain-sprocket arrangement through gear reducer 25. The chain-sprocket arrangement consists of sprockets 43 and 44 and chain 45.

What is claimed is:
1. A machine for identifying rods comprising:
a base;
a shaft mounted on said base;
a flanged feed roll having U-shaped grooves in said flange feed roll, said grooves being spaced a predetermined distance apart;
a tape carried by said flanged feed roll;
a second roll having a surface cooperating with said flanged feed roll and carrying a second tape;
means for feeding a rod to the U-shaped grooves in said flanged roll;
means for indexing said flanged feed roll in synchronization with said means for feeding rods so that said tapes are pressed together about said rod at the point of tangential contact between said flanged feed roll and said second roll;
and means for cutting said tapes after said tapes have been pressed about said rods.
2. A device according to claim 1 wherein said rods are welding rods.
3. A device according to claim 1 wherein said indexing means is a Geneva drive.

References Cited
UNITED STATES PATENTS

| | | | |
|---|---|---|---|
| 3,128,217 | 4/1964 | Brown et al. | 156—522 X |
| 2,039,627 | 5/1936 | Breth | 156—522 X |
| 2,248,744 | 7/1941 | Cohen | 156—522 X |
| 2,362,413 | 11/1944 | Shields | 156—522 X |
| 2,501,341 | 3/1950 | Krueger | 156—522 X |
| 3,616,089 | 10/1971 | Zemek | 156—522 |
| 3,649,419 | 3/1972 | Anderegg | 156—522 X |

HAROLD ANSHER, Primary Examiner

U.S. Cl. X.R.
156—552, 566, 582